United States Patent
Hanzawa et al.

(10) Patent No.: US 7,223,464 B2
(45) Date of Patent: May 29, 2007

(54) COMPOSITE MATERIAL AND PRODUCTION METHOD FOR COMPOSITE MATERIAL

(75) Inventors: Shigeru Hanzawa, Nagoya (JP); Naoki Hashimoto, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 290 days.

(21) Appl. No.: 10/399,835

(22) PCT Filed: Dec. 7, 2001

(86) PCT No.: PCT/JP01/10727

§ 371 (c)(1),
(2), (4) Date: Apr. 22, 2003

(87) PCT Pub. No.: WO02/46124

PCT Pub. Date: Jun. 13, 2002

(65) Prior Publication Data

US 2004/0040804 A1  Mar. 4, 2004

(30) Foreign Application Priority Data

Aug. 12, 2000 (JP) .............................. 2000-374972

(51) Int. Cl.
*D04H 1/00* (2006.01)
*B32B 9/00* (2006.01)
*F16D 65/14* (2006.01)

(52) U.S. Cl. ................. 428/292.1; 428/408; 188/251 R

(58) Field of Classification Search ............. 428/292.1, 428/307.7, 293, 408; 523/149, 150; 188/251 R, 188/251 M See application file for complete search history.

(56) References Cited

U.S. PATENT DOCUMENTS

| 4,131,708 | A |   | 12/1978 | Moores et al. ............... 428/257 |
| 4,979,992 | A | * | 12/1990 | Bache ......................... 106/644 |
| 6,042,935 | A |   | 3/2000  | Krenkel et al. |
| 6,221,475 | B1| * | 4/2001  | Domergue et al. ........ 428/292.1 |

FOREIGN PATENT DOCUMENTS

| DE | 196 51 798 A1 | 6/1998 |
| EP | 0 300 756     | 1/1989 |
| EP | 0 770 791     | 5/1997 |
| EP | 0 835 853 A1  | 4/1998 |
| EP | 1 028 098 A2  | 8/2000 |
| EP | 0 926 111 B1  | 7/2002 |
| JP | 05-170577     | 7/1993 |
| JP | 2000-288374   | 10/2000 |
| WO | WO 96/13471   | 5/1996 |
| WO | WO 97/22815   | 6/1997 |

OTHER PUBLICATIONS

Frank H. Gern et al., "Liquid Silicon Infiltration: Description of Infiltration Dynamics and Silicon Carbide Formation," Composites Part A 28A (1997), Elsevier Science Limited, pp. 355-364.

(Continued)

Primary Examiner—N. Edwards
(74) Attorney, Agent, or Firm—Burr & Brown

(57) ABSTRACT

A composite material including a base material and composite portions is provided. The base material includes carbon fibers and carbon, and the composite portions include a plurality of protruding portions, which include at least silicon carbide, and which are formed as islands distributed in the base material on at least one surface of the composite material.

4 Claims, 1 Drawing Sheet

OTHER PUBLICATIONS

W. Krenkel et al., "Microstructure and Characteristics of CMC Manufactured via the Liquid Phase Route," Proc. Int. Con. Compos. Mater., 9th, 1993, vol. 2, pp. 173-181.

Frank H. Gern et al., "Morphology and Infiltration Dynamics of Liquid Siliconized Carbon/Carbon," Proceedings of ICCM-10, Whistler, B.C., Canada, Aug. 1995, pp. III-61-68.

* cited by examiner

COMPOSITE MATERIAL AND PRODUCTION METHOD FOR COMPOSITE MATERIAL

TECHNICAL FIELD

The present invention relates to a novel composite material light in weight and excellent in wear resistance, oxidation resistance, etc. Particularly, it relates to a composite material usable as friction materials for brake discs fitted to work simultaneously with speed control devices used for stopping large-sized transport machines such as large-sized automobiles and aircraft or for controlling of speed thereof, and a method for producing the same.

BACKGROUND OF THE INVENTION

Development of composite materials light in weight and excellent in wear resistance, oxidation resistance, etc. has been desired from the viewpoints of saving of energy, preservation of the environment, etc. For example, carbon fiber-in-composites (hereinafter sometimes referred to as "C/C composites") have a very high coefficient of friction at high temperatures, and are light in weight and undergo no heat distortion, are widely used as friction materials used in braking devices fitted in large-sized transport machines such as large-sized automobiles and aircraft.

The large-sized transport machines must be sometimes subjected to repeated braking under excess loading for emergent stopping, breaking over a long period of time, and frequent braking, etc. and, hence, in the case of braking devices using C/C composites as friction materials, the friction materials are exposed to high temperatures for a long time in the air. It has been reported that since the friction materials basically comprise, as a main component, carbon fibers which readily burn at high temperatures, the carbon fibers react with oxygen under the above conditions which causes serious wear and also smoking, which sometimes bring about serious accidents. However, materials substitutable for C/C composites have not yet been discovered from the points of frictional force under high temperatures and flexibility required for fitting them in disc brakes.

Under the circumstances, as braking friction materials which can be considerably reduced in wear in the presence of oxygen, even if used as braking friction materials of large-sized transport machines which unavoidably generate high temperature with holding the excellent characteristics of C/C composites (composite carbon fibers), such as excellent impact resistance and light weight and, thus, which are not needed to be frequently exchanged, the inventors have proposed in JP-A-2000-81062 a braking member characterized by comprising a fiber composite material having a yarn aggregate of yarns containing at least bundles of carbon fibers and carbon components other than carbon fibers wherein the yarns are three-dimensionally combined while being oriented in the layer direction and are integrated so as not to separate from each other, and a matrix comprising an Si—SiC material filled between the adjacent yarns in the yarn aggregate.

The braking friction material disclosed in the above patent publication is composed of a composite material comprising ceramics-metal-carbon in which a layer of an Si—SiC material is provided on a base material of a C/C composite. Since the Si—SiC material is formed as a matrix layer of the fiber composite material, the strength of the fibers in the lamination direction increases, and peeling can be inhibited. As a result, durability can be imparted to the braking member. However, for the formation of the matrix comprising the Si—SiC material, it is necessary that the base material which is a C/C composite is impregnated with metallic silicon and then the impregnated product, is fired under desired conditions.

In order to impregnate the C/C composite, which is a laminate having the above construction with metallic silicon, special facilities for carrying out delicate control of temperature, pressure and atmosphere and considerable skill and time are required, and thus further improvement is desired. Moreover, the base material per se has a special structure as mentioned above and hence is not necessarily cheap, and therefore there has been desired development of composite materials having designing performance depending on the use, the manner of use, etc. for completing the articles so as to be able to select such products as being able to exhibit desired performances from the wider groups of products depending on the use, the manner of use, etc., utilizing such base materials as being available more cheaply.

SUMMARY OF THE INVENTION

The present invention has been made under the circumstances as mentioned above, and the object of the present invention is to provide a composite material in which are formed, on the surface, composite portions including protruding portions which comprise at least silicon carbide and metallic silicon which may be contained, if necessary, and superior in wear resistance and oxidation resistance and which are not greatly influenced by the properties of the C/C composite, can be utilized as a base material, and can be produced by a simple method, and a composite material which has a substantially flattened surface on which at least the composite portions are formed and which is obtained by cutting the protruding portions to nearly the same level as the surface of the base material.

As a result of intensive research conducted by the inventors for attaining the above object, it has been found that a composite material can be produced by forming and arranging, in optional or specific forms, composite portions including a plurality of protruding portions comprising at least silicon carbide and optionally metallic silicon and superior in wear resistance and oxidation resistance on the surface of a C/C composite of composite carbon fibers, or on the surface a molded product obtained by molding the C/C composite in a desired shape depending on the use. It has also been found that a composite material which has a substantially flattened surface on which at least the composite portions are formed can be obtained by cutting the protruding portions of the composite material to nearly the same level as the surface of the base material and can be produced more cheaply, and since the resulting composite materials per se are light in weight and causes no ply separation, it is excellent as novel composite materials suitable for the uses such as braking members, various machine tools required to have oxidation resistance in addition to wear resistance, e.g., disc whetstones. Thus, the present invention has been accomplished.

The molded product here naturally includes a sintered product obtained by firing the molded product. Furthermore, the protruding portions mean the portions which protrude even slightly from the surface of the C/C composite which is the base material. The height of the protruding portions is usually about 0.05–1.5 mm, preferably about 0.1–1.0 mm, and the diameter thereof is usually about 0.5–2.5 cm, preferably about 0.7–1.5 cm.

The term sea-island or island structure means that at least the protruding portions are formed in the form of islands on the surface of the base material that defines a sea, and in the composite material of the present invention, it is preferred that the area ratio of the area of the islands to the area of the sea (base material surface) per a specific area at two or more positions is substantially not different. Since the protruding portions comprising at least silicon carbide and metallic silicon which may be contained, if necessary, must sufficiently withstand the repeatedly applied friction force and be firmly fixed on the base material, it is preferred that root-like intruding portions or leg portions are formed to extend from the surface of the base material into the inside of the base material. The depth of the intruding portions or leg portions (hereinafter referred to as "leg portions"/) varies depending on the use of the material, and since the protruding portions must sufficiently stand the repeatedly applied friction force and be firmly fixed on the base material, it is at least about 1.0 mm, preferably at least 2.0 mm, and especially when at least a part of the leg portion is in the form of tube, the depth of the leg portion must be at least 5 mm, preferably not less than 10 mm, and, more preferably, the leg portions pierce the composite material in the thickness direction.

That is, the first aspect of the present invention relates to a composite material comprising a base material composed of carbon fibers and carbon and composite portions comprising at least silicon carbide and optionally metallic silicon formed on the surface of the composite material including a plurality of protruding portions composed of at least silicon carbide and optionally metallic silicon contained and wherein the protruding portions are formed as islands distributed in the sea of the base material. The first aspect of the present invention also relates to a composite material which has substantially flattened surface on which at least the composite portions are formed and which is obtained by cutting the protruding portions to a desired height, preferably nearly the same level as the surface of the base material. One end of the above composite portions forms a protruding portion or a substantially flattened surface and another end extends into at least the base material to form a leg portion, which may be a material comprising at least silicon carbide and optionally metallic silicon. Furthermore, the leg portion may be a material which is a tubular body, a part of which is hollow.

Moreover, the leg portions which are partially hollow tubular bodies may be formed extending from both surfaces of the composite portion, and a tubular leg portion extending from one surface of the composite material and another tubular leg portion extending from another surface of the composite material may be provided at positions alternating with each other, and the tip portion of the leg portion may extend to another end side at such length as exceeding the tip portion of the another tubular leg portion and not piercing the base material.

This material may have a coefficient of dynamic friction at room temperature of 0.05–0.6 and may have a specific abrasion wear of 0.0–0.3 $mm^3/N$ km. Furthermore, it is preferred that when the material is heated at a rate of 10° C./min in atmosphere, the temperature at which the weight reduces by 5% is not lower than 600° C.

The second aspect of the present invention relates to a method for producing a composite material which comprises mounting, on a base material composed of carbon fiber and carbon or a molded product of the base material prepared in a desired size, metallic silicon having the desired diameter and height at a density enough to form an Si—SiC layer by firing a C/C composite or a molded product comprising a C/C composite, then firing the base material having the metallic silicon to melt the metallic silicon, and reacting the molten metallic silicon with the carbon fibers and/or carbon to form a plurality of protruding portions comprising at least silicon carbide and metallic silicon which may be optionally contained, on the surface of the sintered body in the form of islands distributed in the sea of the base material. In other words, it relates to a method for producing a composite material comprising a base material composed of carbon fibers and carbon and composite portions comprising at least silicon carbide and optionally metallic silicon, which are formed on the surface of the composite material, the composite portions including a plurality of protruding portions composed of at least silicon carbide and optionally metallic silicon formed as islands distributed in the sea of the base material, and a composite material which has substantially flattened surface on which at least the composite portions are formed and which is obtained by cutting the protruding portions to nearly the same level as the surface of the base material. The term "substantially flattened" means that the flatness of the surface of the composite material causes no problem when the composite material is used for desired uses, and the difference between the sea surface formed by the surface of the base material and the surface of the composite portions obtained by cutting may be less than 0.05 mm.

The metallic silicon may be in the form of pellets, and, in this case, the metallic silicon in the form of pellets may be arranged so that the protruding portions can be formed at a desired density.

Furthermore, according to the second aspect of the present invention, there is provided a method for producing a composite material which comprises forming fine pores having a desired diameter and depth at a density enough to form protruding portions composed of at least silicon carbide and optionally metallic silicon and having a desired size on the surface of the composite material, impregnating mainly the fine pores with metallic silicon, then carrying out firing to form composite portions comprising a plurality of protruding portions composed of at least silicon carbide and metallic silicon which may be optionally contained and formed in the form of islands distributed in the base material and leg portions one end of which is connected to the protruding portions and another end of which reaches inside of the base material and which are composed of at least silicon carbide and optionally metallic silicon and are in the form of partially hollow tubes.

In this case, the fine pores are preferably bored by a drill, and more preferably bored by a drill so as to obtain a diameter of the pores of 0.3–0.8 mm. Furthermore, it is preferred that the depth of the fine pores measured from the surface of the base material is at least 5 mm, preferably not less than 10 mm, more preferably not less than 100 mm and not more than 150 mm. Moreover, it is preferred that the fine pores are formed in number of 5–50 per 100 $cm^2$ at desired intervals.

The manner of arrangement of the fine pores has no special restriction, and may be formed as uniform as possible. Of course, they may be arranged in the form of concentric circle or distributed in so-called zigzag configuration. In some case, the fine pores may be provided on both sides of the base material. In this case, the arrangement of them is also not limited, but if possible, it is preferred that the positions of the fine pores formed on the one side are uniformly deviated from the positions of the fine pores formed on another side.

The surface of composite material in the present invention means a surface which essentially has performances required depending on the use, and, for example, taking an instance of a braking member, it is a surface of direct contact of the braking member and the damping member in brake damping. That is, the contacting surface may differ depending on the damping systems, but not only top surface and back surface, but also the side surface are included as long as they are surfaces with which the damping member directly contacts.

As a method for cutting the protruding portions formed in the form of islands so that the level of the protruding portions is nearly the same as the surface of the base material, mention may be made of cutting by diamond wheel, etc.

DETAILED DESCRIPTION OF THE INVENTION

Figure 1:
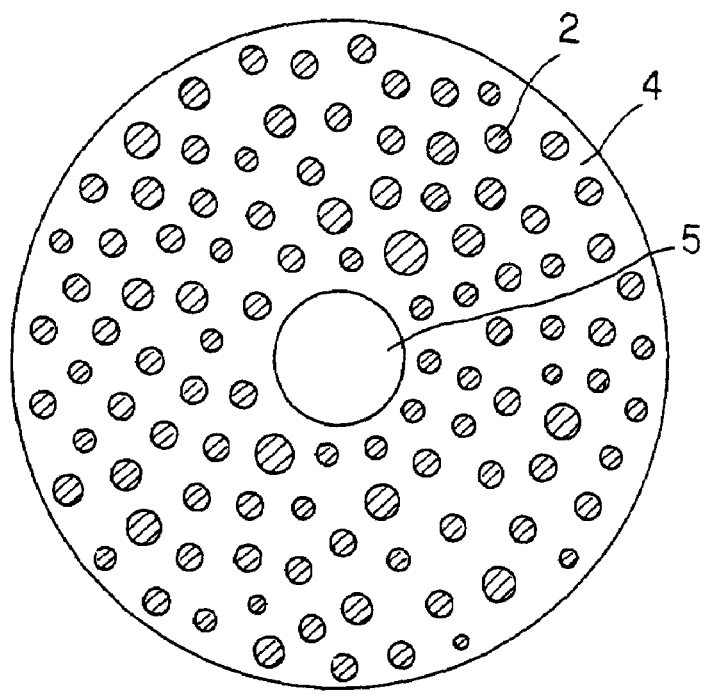
FIG. 1 schematically illustrates the state of arrangement of protruding portions in the composite material of the present invention.
Figure 2:
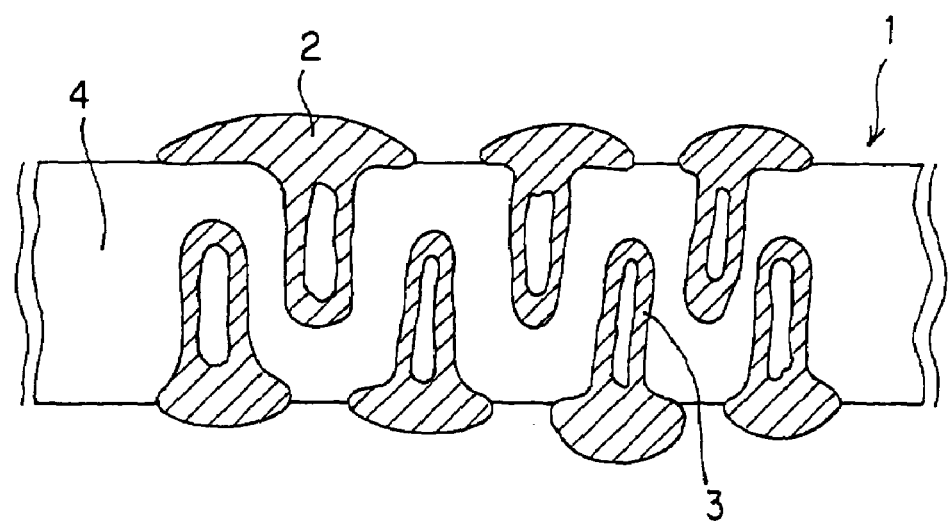
FIG. 2 is an enlarged view which schematically illustrates the partial sectional structure according to one embodiment of the composite material of the present invention.

As shown in FIG. 1, the composite material of the present invention is typically a composite material 1 which comprises a base material 4 comprising a C/C composite, protruding portions 2 distributed in the form of islands on the base material 4, and leg portions 3 (not shown) formed intruding into the base material. As shown in FIG. 2, in the composite material 1, the tip of the leg portion sometimes reaches at least the inside of the base material, and the leg portion 3 in the form of a partially hollow tube may be formed of at least silicon carbide and optionally metallic silicon.

The novel composite material of the present invention will be explained.

In the novel composite material of the present invention, a C/C composite is used as a base material. The C/C composite is usually classified into a high density product having a bulk specific gravity of 1.7–1.9 g/l, an intermediate density product having a bulk specific gravity of 1.5–1.7 g/l, and a low density product having a bulk specific gravity of 1.0–1.5 g/l.

In the present invention, any base materials can be used irrespective of density. For example, mention may be made of AC200 and AC100 manufactured by Across Co., Ltd. as high density products, and intermediate materials in preparation of C/C composite by CVD as intermediate to low density products. When metallic silicon pellets are used for impregnation, those which have a porosity of at least 5.0% may be suitably used, preferably those which have a porosity of at least 10.0%, and more preferably, at least 15.0% in the portion of at least 0.1 mm from the surface of the base material, namely, the surface layer portion.

In the present invention, the C/C composite can be used as base material irrespective of density because metallic silicon can be impregnated in such an amount as being able to form protruding portions comprising silicon carbide and optionally metallic silicon on the surface at a thickness enough to exhibit oxidation resistance and wear resistance.

The metallic silicon to be impregnated is suitably one having a purity of 98% or higher which is used in the field of semiconductors. The metallic silicon may contain substances or elements such as boron nitride, boron, copper, bismuth, titanium, chromium, tungsten, and molybdenum in such a range as not deteriorating the characteristics of the resulting composite materials.

The Si—SiC portion in the present invention is a general term for composite portions including layers or protruding portions and leg portions which contain at least silicon carbide as a main component and optionally includes metallic silicon, and this Si—SiC portion is produced in the following manner. That is, as mentioned hereinafter, a base material or a molded product of the base material is impregnated with metallic silicon, namely, silicon (hereinafter sometimes referred to as "silicon") at a sufficient density to form an Si—SiC portion having the desired thickness by firing, then carrying out the firing, whereby the silicon reacts with carbon atoms constituting the carbon fibers existing on the surface of the base material and/or free carbon atoms remaining on the surface of the carbon fibers, and in the case of impregnating the fine pores with silicon, the silicon reacts with carbon atoms constituting the carbon fibers present around the pores and/or free carbon atoms remaining on the surface of the carbon fibers present in and around the fine pores, and a part of silicon is carbonized. Therefore, the protruding portions comprising silicon carbide and optionally unreacted and remaining metallic silicon are formed on the outermost surface of the C/C composite or the molded product thereof and leg portions which may be partially hollow are formed inside the C/C composite or the molded product thereof. Thus, the Si—SiC portions are formed. The Si—SiC portions are usually formed as islands distributed in the sea of the C/C composite base material on the surface of the C/C composite though it depends on the density of the composite portions comprising at least protruding portions as mentioned hereinafter. Of course, the adjacent islands may link to each other to form a large island.

In the case of using metallic silicon pellets for the formation of the protruding portions, they may be formed at a given density to substantially cover the surface of the C/C composite by adjusting the amount of the metallic silicon arranged per unit area.

Alternatively, the Si—SiC portions may be formed on the surface of the C/C composite islands distributed in the sea of the C/C composite base material by adjusting the density of the fine pores mentioned hereinafter. Of course, the adjacent islands may link to each other to form a large island. The Si—SiC portions may be formed so as to substantially cover the whole surface of the C/C composite by adjusting the density of the fine pores or adjusting the diameter of the fine pores.

Irrespective of the forming methods employed, the above Si—SiC portions can include some different phases from the silicon phase in which silicon remains in a nearly pure state to a nearly pure silicon carbide phase. That is, the Si—SiC portions typically comprise a silicon phase and a silicon carbide phase, but may contain a Si—SiC coexisting phase in which the content of carbon gradually changes based on silicon. Accordingly, the Si—SiC portions are composite portions containing at least protruding portions formed from materials in which concentration of carbon changes from 0 mol % up to 50 mol %.

Depending on the kind of the base materials and uses of the composite material, composite portions in which leg portions having enough strength against mechanical actions such as frictional force are formed can be formed by arranging metallic silicon pellets on the base material so as to give a desired form, followed by firing. However, in order to more surely form the leg portions having sufficient strength to undergo the above-mentioned action, fine pores are formed by a drill or the like mentioned hereinafter and metallic silicon may be impregnated centering around the fine pores. In this case, also in the fine pores, the silicon reacts with carbon atoms constituting the carbon fibers present around the pores and/or free carbon atoms remaining on the surface of the carbon fibers present in and around the fine pores, to thereby produce silicon carbide. As a result, in the fine pores, leg portions are formed as at least partially hollow tubes comprising silicon carbide and optionally metallic silicon and deeply reach the inside of the base material. The leg portions, in the form of at least partially hollow tubes formed of silicon carbide and optionally metallic silicon, exert an anchoring effect. That is, the leg portions in the form of at least partially hollow exhibit the effect to be able to inhibit the protruding portions formed on the surface of the C/C composite or a molded product thereof from peeling off the base material, even when an unexpectedly greater mechanical shock is applied to the protruding portions.

The term "at least partially hollow" means that the amount of silicon carbide produced by the reaction of silicon with carbon atoms constituting the carbon fibers present around the pores and/or free carbon atoms remaining on the surface of the carbon fibers present in and around the fine pores, and the amount of metallic silicon which may remain in the unreacted state do not reach the amount to completely fill up the fine pores, and hollow portions remain in a part of the leg portion. The leg portion, in the form of at least partially hollow tube which comprises silicon carbide and optionally metallic silicon is a tube formed mainly from silicon carbide, and one end thereof connects with the protruding portion and another end reaches deeply at least inside of the base material. The average diameter of the tubes is usually about 0.6—about 1.0 mm, though it depends on the diameter of the fine pores, and the total length is usually at least about 10 mm, preferably at least about 15 mm, though it depends on the thickness of the base material. Of course, piercing pores may be formed depending on the use as mentioned above.

Next, a method for producing the novel composite material of the present invention will be explained. First, explanation is made of a case where the protruding portions are formed by directly arranging metallic silicon in the form of pellets on the surface of the base material.

On a C/C composite prepared in a desired size or a molded product thereof produced by a conventional method, pellets of metallic silicon are arranged at a density enough to form protruding portions having desired height on the surface of the C/C composite or the molded product thereof, followed by heating to a desired temperature to melt the metallic silicon in the form of pellets to impregnate at least the surface part with the molten metallic silicon and followed by firing at a desired temperature, thereby forming composite portions including a plurality of protruding portions having a desired height and comprising silicon carbide and optionally metallic silicon in as islands in the sea of the base material on the surface of the sintered body of the C/C composite or the molded product comprising the C/C composite.

The pellets of the metallic silicon to be arranged on the surface of the molded product suitably have a hemispherical shape having flat bottom. The size of the pellets can be usually selected corresponding to the size or depth of the protruding portions to be formed. The number of metallic silicon pellets arranged is about 5–50, preferably about 16–36 per 100 $cm^2$, and these pellets can be arranged at desired intervals, preferably in such positions to provide uniform intervals between the protruding portions.

In order to melt and impregnate the metallic silicon pellets and then react it with carbon fibers constituting the base material and carbon powders present on the carbon fibers, a given amount of the pellets of metallic silicon at the given intervals as mentioned above and the C/C composite or the molded product are kept in a temperature area of 1100–1400° C. under an oven internal pressure of 0.1–10 hPa for at least 1 hour. In this case, preferably, an inert gas in an amount of 0.1 NL (normal liter: corresponding to 5065 liters in the case of 1200° C. and pressure 0.1 hPa) per 1 kg of total weight of the C/C composite or the molded product and the metallic silicon is passed and at least a part of it is penetrated into the inside of the C/C composite or the molded product thereof from the surface thereof. Then, the temperature is raised to 1450–2500° C., preferably 1700–1800° C. to melt and impregnate silicon into the C/C composite or the molded product thereof to form Si—SiC material. In this process, in case unfired C/C composite or molded product is used, firing of the C/C composite or molded product thereof is also carried out to produce the composite material of the present invention.

Next, an explanation will be made of the method of producing leg portions, at least a part of which is hollow and which is formed of silicon carbide and optionally metallic silicon, in the state of being connected to the protruding portions.

First, fine pores having the desired size and depth are formed at a sufficient density to form composite portions including protruding portions having the desired height by firing on the C/C composite prepared in a desired size or the molded product prepared from the C/C composite by a conventional method, followed by heating to a desired temperature to impregnate the fine pores with metallic silicon. Then, the product is fired to form a plurality of composite portions including protruding portions comprising silicon carbide and optionally metallic silicon preferably having a desired height on the surface of the C/C composite or the molded product comprising the C/C composite in the form of islands distributed in the sea of the base material, the composite portions have leg portions reaching the desired depth inside the base material, which are in the form of partially hollow tubes and are formed of silicon carbide and optionally metallic silicon by the reaction of carbon and metallic silicon present on the surface of the fine pores.

For forming the fine pores, any methods may be employed which can bore fine pores of 0.3–0.8 mm, preferably 0.4–0.6 mm in diameter. That is, mention may be made of methods usually employed for boring fine pores, such as boring by a drill, boring by laser, making pores by a drill, etc., among which boring by a drill is preferred from the points of operational efficiency, linearity of the obtained fine pores. As the drills employed, a diamond-coated drill is preferred from the boring performance and the revolution number for processing is preferably at least 3600 rpm. The depth of the fine pores is usually at least about 10 mm, preferably up to 15 mm measured from the surface of the base material though it depends on the thickness of the base material used. Of course, the pores may be piercing pores depending on the use as mentioned above.

As mentioned above, the depth of the fine pores may be at least about 10 mm, preferably about 15 mm from the surface of the base material, and the pores are not necessarily needed to pierce the C/C composite or the molded product thereof as a base material.

Furthermore, the fine pores may be formed at a sufficient density to form the protruding portions having a desired height by firing as mentioned above, and usually they are formed in number of about 5–50, preferably 16–36 per 100 cm$^2$ at desired intervals, preferably at such positions that the intervals between them are uniform. Of course, it is necessary that they are uniformly formed on the surface of the C/C composite or the molded product formed from which the C/C composite is produced in a desired size by a conventional method. In other words, it is necessary that the density of the pores per 100 cm$^2$ at optional portions is within the above range.

Depending on the use, it is necessary to form the protruding portions on both sides of the C/C composite or the molded product comprising the C/C composite, and in this case, it is preferred that the positions of the fine pores bored from each side is such that the tip portions are positioned in desired intervals. It is especially preferred to form them so that the positions of the fine pores bored from each side are alternating. Thus, Si—SiC layers are formed in a substantially uniformly dispersed state, and are formed in an islands-sea structure on the surface of the C/C composite. Moreover, a composite material can be provided having a substantially flattened surface on which are formed at least the composite portions and which is obtained by cutting the protruding portions protruding from the sea level to nearly the same level as the surface of the sea by a suitable processing such as cutting.

Desirably, a C/C composite or a molded product thereof and metallic silicon are kept at a temperature in a range of 1100–1400° C. under pressure in a range of 0.1–10 hPa for 1 hour while controlling so as to flow an inert gas in an amount of at least 0.1 NL, preferably at least 1 NL, more preferably at least 10 NL based on 1 kg of the total weight of the C/C composite or the molded product and the metallic silicon. By using such an inert gas atmosphere in firing (namely, the stage before melting of Si and impregnation with Si), gas such as CO generated with the change of inorganic polymer or inorganic material into ceramics can be removed from the firing atmosphere and, in addition, external pollution of the firing atmosphere with O$_2$ or the like in the air can be inhibited. As a result, the desired amount of metallic silicon can be molten and impregnated into the fine pores.

When metallic silicon is molten and impregnated in the C/C composite or the molded product, the atmospheric temperature is raised to 1450–2500° C., preferably 1700–1800° C. In this case, the pressure in the firing oven is preferably in the range of 0.1–10 hPa.

Since the thus obtained novel composite material of the present invention has a high coefficient of dynamic friction at room temperature, namely, 0.05–0.6, and furthermore, since the protruding portions comprising silicon carbide and optionally metallic silicon which have oxidation resistance, creep resistance and spalling resistance have an islands-sea structure with respect to the base material or the composite portions, the surface of which is substantially flattened by cutting the protruding portions to nearly the same level as the surface of the sea, are formed on the surface of the composite material, the low oxidation resistance of the C/C composite can be improved, and the composite can be used, for example, as braking friction materials which are necessarily exposed to high temperatures in the presence of oxygen. The abrasive wear under such conditions is not more than 1.0%/hour, more preferably not more than 0.6%/hour at 50° C. Furthermore, the composite material has additionally superior wear resistance.

Moreover, since the composite material uses a C/C composite as the base material, it is light in weight, and even when it is mounted on large transport machines, consumption of fuels is not substantially affected, and it does not cause any energy consumption problems and meets the requirement for saving of energy. Furthermore, since the base material is ac/C composite, the composite material has a high toughness, excellent impact resistance and high hardness properties. Therefore, the defect of low high-temperature wear resistance can be overcome while maintaining the characteristics of conventionally used C/C composites.

Since the protruding portions comprising silicon carbide and optionally metallic silicon are formed on the surface of the base material, even if the composite material is exposed to oxygen at high temperatures, Si—SiC material present on the surface is molten to become glass, and the rate of protecting the base material per se from oxygen is higher than the rate of diffusion of oxygen into the C/C composite which is a base material, and thus the base material can be protected from oxidation. That is, the composite material of the present invention shows self-restoration property and can be used for a longer period of time. This effect is not affected even when metallic silicon contains substances or elements such as boron nitride, copper, and bismuth.

Furthermore, since the SiC material has a larger thermal expansion coefficient than the C/C composite, when the material is used as a braking member at high temperatures generated by brake damping for a long time, there is the possibility that the SiC material layer would be peeled, while in the case of the composite material of the present invention, the thermal coefficient of expansion of the SiC protruding portions and optionally metallic silicon formed on the surface, or the composite portions the surface of which is substantially flattened and which is obtained by cutting the protruding portions to nearly the same level as the surface of the sea, is similar to the thermal coefficient of expansion of the C/C composite material, and hence, peeling caused by a difference in the coefficient of thermal expansion can be prevented, and the material can have excellent properties when used as a braking member.

Since the composite material of the present invention has the impact resistance, high hardness and light weight of the C/C composite along with the oxidation resistance, spalling resistance, self-lubricity and wear resistance associated with the Si—SiC material, and since the composite material further has self-restoration property, the composite material can withstand use under high-temperature oxidizing conditions for a long period, and specifically, can be suitably used as braking members in the field of large transport machines.

In case the composite material of the present invention is produced by previously molding into a desired shape, followed by reacting with metallic silicon, it can be used as it is as a desired member by surface polishing after firing, while in the case of a composite material produced by firing the C/C composite as it is, the composite material is produced by cutting to a suitable size by a surface grinding machine or the like, followed by surface grinding.

Next, the present invention will be explained by the following examples and comparative examples, which should not be construed as limiting the invention in any manner.

The composite materials obtained in the examples and comparative examples were evaluated on the characteristics by the following methods.

(Evaluation of Coefficient of Dynamic Friction)

A test piece was set at a jig and revolved for 10 minutes at 100 rpm, and a counter material (SUJ 10 mm ball) was pressed to the test piece under a load Fp (N) of 2 kg, and the frictional force Fs (N) in this case was measured. The value of coefficient of friction was calculated by the following formula:

Coefficient of friction $\mu = Fs/Fp$.

(Evaluation of Specific Abrasive Wear)

A test piece was set at a jig and revolved for 10 minutes at 100 rpm, and a counter material (SUJ 10 mm ball) was pressed to the test piece under a load P of 2 kg, and the weight Wa (mg) before the test and the weight Wb (mg) after the test was measured. The abrasive wear V (mm$^3$) was calculated from the density $\rho$ (g/cm$^3$) of the test piece by the following formula:

$V = (Wa - Wb)/\rho$.

The specific abrasive wear Vs (mm$^3$/(N Km) was calculated from the abrasive wear V (mm$^3$), the test load P (N), and the sliding distance L (km) by the following formula:

$Vs = V/(PL)$.

(Evaluation of Oxidation Resistance)

A test piece was left to stand in an oven (1% $O_2$, 99% $N_2$) at 1150° C., and reduction rate of the weight after 200 hours was measured to evaluate the oxidation resistance.

(Evaluation of Compression Strength)

A compression load was applied to a test piece and the compression strength was calculated by the following formula:

Compression strength=$P/A$;

wherein in the above formula, P indicates a load at application of maximum load, and A indicates a minimum sectional area of the test piece.

(Weight Reduction Rate under High-Temperature Oxidizing Conditions)

After a test piece in a desired amount was kept at 400° C. for 100 hour in the air, the weight of the test piece was measured, and the weight after completion of the test was subtracted from the weight before beginning of the test to obtain decrement of the weight, which was calculated as a reduction rate with respect to the weight before the beginning of the test.

(Evaluation of Interlaminar Shear Strength)

A three-point bending test was conducted on a test piece with using a distance which was 4 times the thickness h of the test piece as a distance between supports, and the interlaminar shear strength was calculated by the following formula:

Interlaminar shear strength=$3P/4bh$;

wherein in the above formula, P indicates a maximum breaking load in bend, and b indicates a width of the test piece.

(Evaluation of Bending Modulus)

A three-point bending test was conducted on a test piece with using a distance which was 40 times the thickness h of the test piece as a distance L between the supports, and the bending modulus was calculated using the initial gradient $P/\sigma$ of the linear part of a load-deflection curve by the following formula:

Bending modulus=$\frac{1}{4}L^3/bh^3 P/\sigma$;

wherein in the above formula, b indicates a width of the test piece.

(Evaluation of Self-Restoration Property)

Repeated stressing of Max:20 Mpa–Min:5 MPa was applied 100,000 times to cause the occurrence of microcracks inside the test piece, and then the test piece was annealed in an argon atmosphere at 900° C. for 2 hours and measurement of the compression strength was carried out.

(Measurement of Temperature at which the Weight is Reduced by 5%)

The change in the weight of a sample was measured with heating at a rate of 10° C./min while giving a sufficient gas stream in the air, and the temperature at which the weight of the sample reduced by 5% was obtained.

EXAMPLE 1

A composite material of the present invention was produced under the following conditions using a C/C composite (bulk specific gravity: 1.6; manufactured by Across Co., Ltd.) having a thickness of 20 mm as a base material. That is, on one side of the above C/C composite were arranged pellets of metallic silicon in number of 30 per 100 cm$^2$ which had a diameter of 10 mm, a height of 20 mm and a weight of 3 g and a purity of 99.0% at given intervals. The base material was impregnated with the metallic silicon, followed by firing to form, on the fired body, composite portions including a plurality of protruding portions comprising silicon carbide and optionally metallic silicon formed as islands distributed in the sea of the base material. Thus there was obtained the desired composite material comprising a base material comprising carbon fibers and silicon carbide and metallic silicon where the composite portions comprised a plurality of protruding portions comprising silicon carbide and optionally metallic silicon and formed as islands distributed in the sea of the base material on the surface of the sintered body of the C/C composite and a molded product comprising the C/C composite and leg portions formed penetrating into the base material and being connected to the protruding portions.

The resulting composite material was cut to 60 mm long, 60 mm broad and 5 mm thick by a surface grinding machine, and then subjected to surface grinding finishing by a #800 grinding stone to make a braking member. The ground surface of the thus obtained braking member had a surface roughness Ra of 1 μm and a flatness of 2 μm in terms of straightness. The coefficient of friction, specific abrasive wear, oxidation resistance, interlaminar shear strength, compression strength, bending modulus, temperature at which the weight reduced 5% under high-temperature oxidizing conditions, etc. of the thus obtained braking member were measured by the aforementioned measuring methods, and the results are shown in Table 1.

EXAMPLE 2

A composite material of the present invention was produced under the following conditions using a commercially available C/C composite (bulk specific gravity: 1.3; manufactured by Across Co., Ltd.) having a thickness of 20 mm as a base material. That is, as schematically shown in FIG. 2, in order to form composite portions on both sides, 20/100 cm$^2$ of fine pores of 0.5 mm in diameter and 15 mm in depth were bored by a drill having electrically deposited diamond at the tip portion, on both sides of the above C/C composite at given intervals at such positions as the pores bored on the respective sides being alternating. This was impregnated with metallic silicon of 99.0% in purity, followed by firing to form, on the fired body, composite portions comprising a plurality of protruding portions comprising metallic silicon and silicon carbide and formed in the form of islands distributed in the sea of the base material, and leg portions comprising silicon carbide and being in the form of partially hollow tubes the tip portions of which deeply reached the inside of the base material and which were connected to the protruding portions. Thus there was obtained the desired composite material comprising a base material comprising carbon fibers, and silicon carbide and metallic silicon where composite portions comprised a plurality of protruding portions comprising metallic silicon and silicon carbide and formed in the form of islands distributed in the sea of the base material on the surface of the sintered body of the C/C composite or a molded product comprising the C/C composite and leg portions comprising silicon carbide and being in the form of partially hollow tubes the tip portions of which deeply reached the inside of the base material.

The resulting composite material was cut to 60 mm long, 60 mm broad and 5 mm thick by a surface grinding machine, and then subjected to surface grinding finishing by a #800 grinding stone to make a braking member. The ground surface of the thus obtained braking member had a surface roughness Ra of 1 μm and a flatness of 2 μm in terms of straightness. Coefficient of friction, specific abrasive wear, oxidation resistance, interlaminar shear strength, compression strength, bending modulus, temperature at which weight reduced 5% under high-temperature oxidizing conditions, etc. of the thus obtained braking member were measured by the aforementioned measuring methods, and the results are shown in Table 1.

COMPARATIVE EXAMPLE

A fiber composite material comprising a C/C composite base material having a thickness of 20 mm provided with a matrix layer comprising an Si—SiC material was produced, and a braking member was made using the fiber composite material.

The C/C composite was produced by the method disclosed in JP-A-2000-81062, namely, by the following method.

Prepreg sheets comprising carbon fibers arranged in one direction and impregnated with a phenolic resin were laminated so that the carbon fibers in the respective sheets crossed at right angles, followed by curing the resin by a hot press at 180° C. and under 10 kg/cm$^2$. Then, the laminate was fired at 2000° C. to obtain a C/C composite having a density of 1.0 g/cm$^3$ and an open porosity of 50%.

Then, the obtained C/C composite was placed in a carbon crucible filled with Si powders of 99.8% in purity and 1 mm in average particle diameter. Then, the carbon crucible was transferred into a firing oven. The C/C composite was treated under the conditions of a temperature in the firing oven of 1300° C., a flow rate of an argon gas as an inert gas of 20 NL/min, a pressure in the firing oven of 1 hPa, and a retention time of 4 hours, and thereafter the temperature in the oven was raised to 1600° C. while keeping the pressure in the firing oven as it was, thereby impregnating the C/C composite with Si to obtain a composite material.

A test piece was cut out from the surface layer part of the C/C composite in which Si—SiC material and the C/C composite were sufficiently compounded, and this was cut to 60 mm long, 60 mm broad and 5 mm thick by a surface grinding machine, and then subjected to surface grinding finishing by a #800 grinding stone to make a braking member. The ground surface of the thus obtained sliding material had a surface roughness Ra of 1 μm and a flatness of 2 μm in terms of straightness.

The properties of the thus obtained braking member were measured by the same methods as in Example 1, and the results are shown in Table 1.

TABLE 1

| | Material | | |
|---|---|---|---|
| Item of Measurements | Example 1 | Example 2 | Comparative Example |
| Coefficient of friction | 0.4 | 0.5 | 0.5 |
| Specific abrasive wear (mm$^2$/(N/Km)) | 0.2 | 0.3 | 0.2 |
| Oxidation resistance (weight reduction %) | 0.5 | 0.3 | 0.2 |
| Interlaminar shear strength (MPa) | 20 | 22 | — |
| Compression strength (MPa) | 280 | 275 | 250 |
| Bending modulus (MPa) | 55 | 55 | 60 |
| Temperature at which 5% reduction in weight under high-temperature oxidizing conditions (° C.) was observed | 700 | 720 | 750 |

Note:
In the above table, the mark "—" means that the measurement was impossible.

It can be seen from Table 1 that the composite materials of the present invention were by no means inferior to the braking member disclosed in JP-A-2000-81062 proposed by the inventors in the measured properties and thus were excellent composite materials. That is, it can be seen that the braking members made from the composite materials of the present invention had the similar coefficient of friction and wear resistance under high temperature conditions in the presence of oxygen to those of the braking member disclosed in the above patent publication.

With respect to the specific abrasive wear, the braking members according to the present invention were also equal to those of the comparative examples, and, furthermore, the braking members according to the present invention showed excellent compression strength and interlaminar shear strength and showed nearly the same bending modulus as the C/C composite.

In the case of the composite materials of the present invention, there were formed composite portions comprising a plurality of protruding portions composed of metallic silicon and silicon carbide, one end of which was formed in the form of islands distributed in the sea of the base material, and leg portions comprising silicon carbide which were connected to the protruding portions and in the form of at least partially hollow tubes and tip portions of which deeply reached the inside of the base material. Therefore, it is considered that the braking members according to the present invention were higher in compression strength than the braking members of the comparative examples. Of course, the same effect can be expected when the composite materials have substantially flattened surface obtained by cutting the protruding portions to nearly the same level as the surface of the sea.

INDUSTRIAL APPLICABILITY

In the case of the composite materials of the present invention, an Si—SiC layer which is superior in wear resistance under high temperature conditions in the presence of oxygen and has oxidation resistance, creep resistance and spalling resistance forms composite portions comprising protruding portions, which are distributed in the form of an islands-sea structure or the composite portions formed on the surface have a substantially flattened surface obtained by cutting the protruding portions to nearly the same level as the surface of the sea. Therefore, the low oxidation resistance of the C/C composite can be overcome and the materials can be used at high temperatures and in the presence of oxygen. Furthermore, the materials also have excellent wear resistance.

Moreover, since the C/C composite is used as a base material, the composite materials are light in weight, experience less loss of energy and meet the requirements for saving of energy.

Furthermore, since the base material is a C/C composite, the composite materials have high toughness, excellent impact resistance and high hardness.

Therefore, the composite materials of the present invention are highly promising materials, for example, for use as braking members in braking devices of large transport machines used at high temperatures and in the presence of oxygen and members of various machine tools.

The invention claimed is:

1. A composite material comprising:
   a base material comprising carbon fibers and carbon; and
   composite portions comprising a plurality of protruding portions which comprise at least silicon carbide and which are formed on at least one of a first surface and an opposed second surface of the composite material as islands distributed in the base material, and a plurality of leg portions comprising at least silicon carbide and which extend into the base material;
   wherein the leg portions each comprise partially hollow tubes that extend within the base material from one of the first surface and the second surface of the composite material toward the other one of the first and second surfaces of the composite material, such that the leg portions extending from the first surface of the composite material are provided in alternating positions with respect to the leg portions extending from the second surface of the composite material, and such that tip portions of the leg portions within the base material that extend from one of the first and second surfaces of the composite material extend beyond tip portions of the leg portions within the base material that extend from the other one of the first and second surfaces of the composite material; and
   wherein a length of the leg portions is less than a distance between first and second surfaces of the base material such that the tip portions of the leg portions do not protrude beyond the first and second surfaces of the composite material.

2. The composite material according to claim 1, wherein a coefficient of dynamic friction at room temperature of the composite material is in a range of 0.05–0.6.

3. The composite material according to claim 1, wherein a specific abrasive wear of the composite material is in a range of 0.0–0.3 mm$^3$/Nkm.

4. The composite material according to claim 1, wherein the protruding portions further comprise metallic silicon.

* * * * *